(No Model.) 2 Sheets—Sheet 1.

G. LOWRY.
STONE CRUSHER.

No. 431,069. Patented July 1, 1890.

Witnesses:
Albert H. Adams
Robert A. Millar

George Lowry, Inventor.

(No Model.) 2 Sheets—Sheet 2.

G. LOWRY.
STONE CRUSHER.

No. 431,069. Patented July 1, 1890.

Witnesses:
Albert H. Adams
Robert A. Millar

George Lowry, Inventor

UNITED STATES PATENT OFFICE.

GEORGE LOWRY, OF NORTHAMPTON, COUNTY OF NORTHAMPTON, ENGLAND.

STONE-CRUSHER.

SPECIFICATION forming part of Letters Patent No. 431,069, dated July 1, 1890.

Application filed February 13, 1890. Serial No. 340,271. (No model.)

*To all whom it may concern:*

Be it known that I, GEORGE LOWRY, residing at Northampton, in the county of Northampton, England, and a subject of the Queen of Great Britain, have invented a new and useful Improvement in Stone-Crushers, of which the following is a specification, reference being had to the accompanying drawings, in which—

Figure 1:
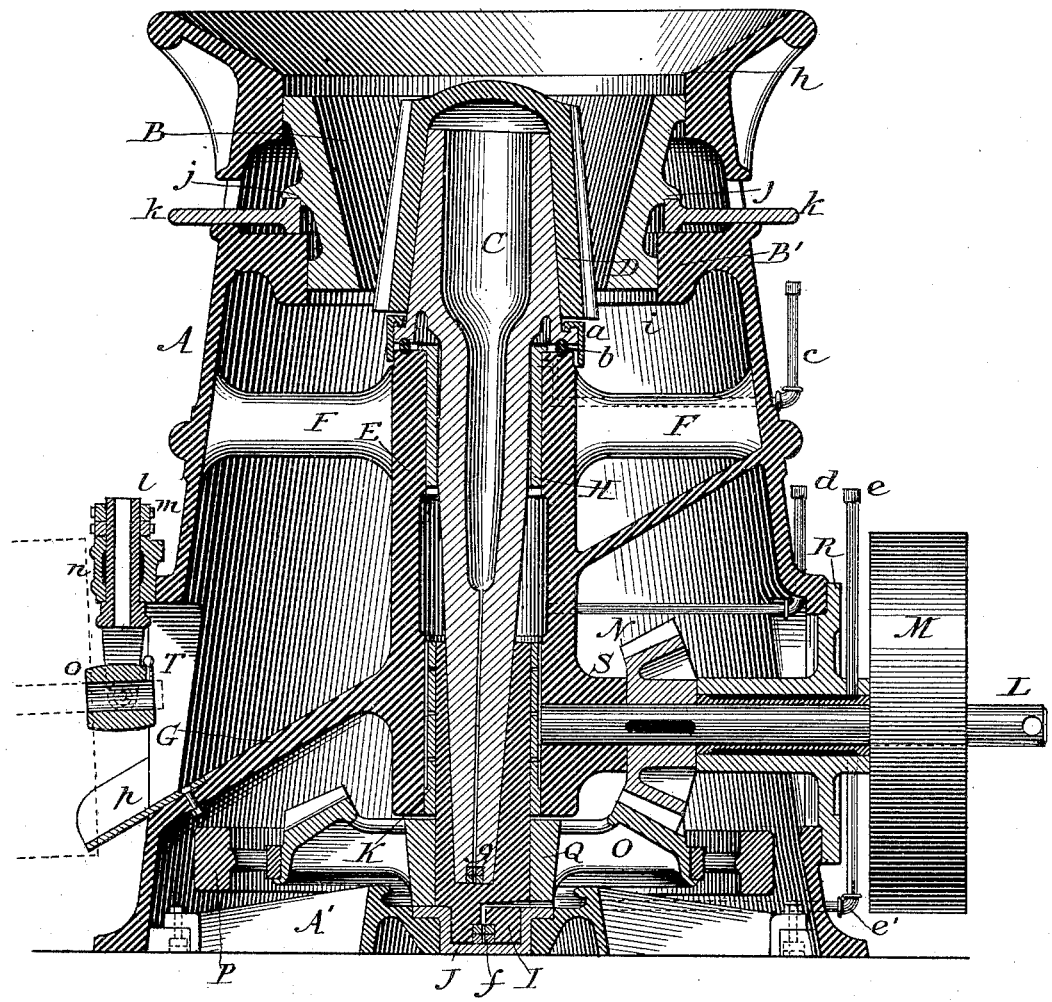
Figure 2:
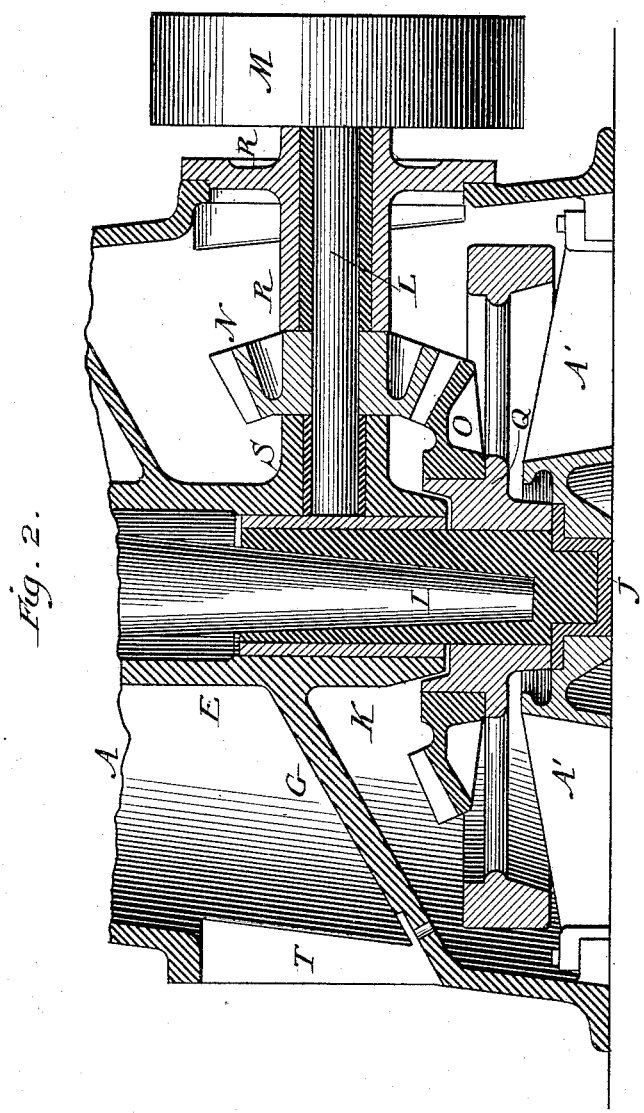

Figure 1 is a vertical section, and Fig. 2 is a similar section of the base of the machine, showing a modification for applying the balance-wheel.

The object of this invention is to construct a stone-crusher with an unobstructed feeding space or hopper; to locate the fulcrum of the crusher-shaft below the crushing-head; to apply a balance-wheel to the socket or eccentric-box of the crushing-shaft; to make the lower bearings of a gyrating shaft operate on centers, and to improve the construction and operation of the various parts of a crusher having a gyrating shaft.

The nature of my invention will be pointed out in the claims.

In the drawings, A indicates the exterior shell of the crusher; A', its base; B, the exterior crushing-shell, sometimes called a "concave;" B', a supporting-ring projecting inwardly from the shell A; C, the shaft; D, the crushing-head; E, the central tubular resisting bearing-piece for the shaft; F, supporting-arms for the bearing-piece E; G, a diaphragm, which, in addition to its office of shunting the crushed material and protecting the lower gearing from dust, also furnishes an additional support for the bearing E.

H is a renewable lining for the upper bearing of the shaft; I, the eccentric bearing or box; J, the lower bearing for the eccentric-box and driving-wheel; K, renewable lining or box for the eccentric-bearing.

L M are driving-shaft and wheel; N O, bevel-gear.

P is a balance-wheel; Q, a hub to which the balance-wheel may be either directly or indirectly attached; R, the outer cover-plate and bearing, and S the inner bearing for the shaft L.

T is the discharge-opening.

*a* is a flange ring or band for protecting the upper end of the bearing E against the intrusion of dust; *b*, an elastic ring or disk placed in the joint for the same purpose. These dust-excluding devices may be used together as auxiliary to each other, or either may be used separately.

*c d e e'* are oil-pipes; *f g*, wearing plates or buttons; *h*, upper and *i* lower supports for the crushing-shell B.

*j* is an exterior ring on the crushing-shell for supporting it in place and also strengthening the crushing-shell; *k*, supporting-blocks, which may, for convenience, be provided with handles or extensions, as shown; *l*, a coupling-shaft for attaching and supporting the end of a screen.

*m* indicates the adjusting-nuts; *n*, the bearing for the shaft *l*; *o*, a pivoted bearing for the screen-shaft, and *p* a diaphragm-extension for delivering the crushed material into the screen.

The shell A is usually made of cast-iron and cast in one piece, as shown; but it may be cast in horizontal sections or rings provided with suitable flanges for connecting the sections together by bolts.

The base A' has its central portion constructed as shown, and I prefer to locate it within the shell A, as shown; but it is evident that it may be enlarged and that the shell A may be mounted thereon, instead of extending downwardly around it.

The shaft C may be of forged steel in substantially the form shown, and in order to avoid the use of unnecessary material when made of cast-steel I make the upper end hollow, as shown, and from such hollow I bore an oil hole or passage to the bottom, and in order to give the oil a free flow I continue the hole through the buttons or plates *g*; or, in other words, I make these buttons or plates in disk form with a hole through the middle. The upper end of the shaft has an exterior taper, as shown, over which is placed the crushing head or cap D. This cap is usually made of cast-steel, which may be tempered or partly tempered to increase its wearing capacity, and, if desired, it may be fastened to the shaft C by any well-known or suitable means, and I prefer to provide the exterior of this head or cap with ribs or corrugations, as shown; but they are not essential.

The crushing-shell B is made of cast-iron and of sufficient strength to withstand the crushing-pressure. Its interior is tapered, as shown, and, if desired, it may be provided with wearing plates or linings; but as it is so easily removed and replaced by a new one such linings are not essential. The exterior of this crushing-shell is fitted at its upper and lower ends to bear against the inward projections of the shell A, which projections on their inner faces $h$ and $i$ are fitted to receive the ends of the crushing-shell, so as to give them the proper support, and they are made vertical at $h$ and $i$, so that the shell may be readily withdrawn or raised or lowered, as desired.

The projection B′ from the shell A extends inward sufficiently farther than the upper one to give the lower end of the crushing-shell a strong support without requiring such shell to be unnecessarily heavy, as would be the case if the upper and lower projections were of the same interior diameter for a crushing-shell interiorly inclined upward and outward, and they also furnish a support for the adjusting-blocks $k$.

The ring $j$ of the crushing-shell rests upon the supporting-blocks $k$ and prevents the shell from moving or working downward. Any number of these blocks $k$ may be used; but from two to four will usually be sufficient. The supporting-blocks are made oblong, so that each block will furnish a support at two different heights by simply giving it a quarter-turn, and if a greater variation or a greater number of variations are required than are given by one set of blocks an additional set or additional sets may be provided. This arrangement furnishes a convenient and efficient means for varying the height of the crushing-shell, and, as will be seen, for varying the size of the fragments of crushed stone or ore, as by raising the shell the size will be increased and by lowering it the size will be diminished.

The head or enlarged portion of the shaft C is provided with a sufficient extension to support and carry the ring or band $a$, which ring is best made in the form shown and dropped over the end of the shaft before the head or cap D is placed in position; but I do not limit myself to this manner of applying or attaching this ring or band. I also slightly groove the base of the projecting portion of the shaft and the upper end of the bearing E and insert therein an elastic ring for excluding dust or assisting in excluding it. This ring is best made of rawhide, but it may be made of common rope or of rubber; but, as the shaft C has some independent motion, rubber is more liable to get out of order than either of the others.

The band $a$ is to be of sufficient width to extend down over the opening between the enlarged portion of the shaft and its bearing. Instead of placing this band $a$ upon the exterior, as shown, it may be placed at the inside of the bearing and extend down slightly between the bearing E and the bushing or lining H, in which case it would be put in place before the shaft is put in position.

The bushing H is usually made of bronze or the best quality of cast-steel, as is also the bearing-support J. As there is no obstruction to the lifting or removal of the shaft C, this bushing is easily renewed whenever necessary. This bearing may be slightly tapered inwardly from the top down about two-thirds of its length; or it may be cylindrical and a slight swell or reverse taper given to the shaft, so as to permit of the proper movement of the shaft and prevent binding or unnecessary wear when the shaft is gyrating. As the shaft is vibrating in the upper end of this tubular resisting-bearing E, which is the bearing that furnishes the crushing resistance, as in this machine, the crushing-bearing is below the crushing-head instead of above, as has heretofore been usual.

The lower end of the bearing E supports the eccentric-box for the shaft-bearing I and also the bearing S for the shaft L, and it is held in position by the arms F at its upper end and at its lower end by the arms F and the diaphragm G, the lower portion of the diaphragm giving it a sufficiently strong support to enable me to support in this bearing-piece E the bearing S of the driving-shaft. The lower end of this bearing-piece E is also provided with a bushing or lining K between it and the eccentric-box I, and as this bushing is slightly smaller than the bushing H it is easily removed and replaced from the top by simply removing the shaft C and the bushing H. The eccentric-bearing is cylindrical on its exterior, and its interior is provided with a taper bearing for the shaft, which is eccentric, as shown, which eccentricity is sufficient to give the shaft its proper gyratory movement. The hub Q is attached directly to this bearing by the usual means of a spline or key, and its lower end rests in the bearing J, as shown. This bearing J is so formed that it not only supports the lower end of the eccentric-bearing I, but it also forms a bearing for the hub Q, and it thereby relieves the eccentric-box from the weight of the bevel-wheel O and the balance-wheel P, thus dividing the bearing and thereby preventing additional friction, which would otherwise be caused by the addition of the balance-wheel from being carried by the bottom bearing of the eccentric-box.

I have found in actual practice that the balance-wheel P greatly improves the action of the crusher and largely increases its capacity for work. This balance-wheel may be attached to the bevel-wheel O by a band and short arms, as shown in Fig. 1, or the arms may be extended to and be cast with the hub Q and the bevel-wheel be supported thereon, as shown in Fig. 2. When made as shown in Fig. 1, it will be keyed or otherwise firmly secured to the bevel-wheel, and when made in the form of Fig. 2 the bevel-wheel will be separately keyed to the hub Q or attached to the arms of the balance-wheel, as may be found most convenient. The hub Q is keyed to the eccentric-box I, which is driven by it, and which in turn is driven by the bevel wheel or pinion N, attached to the shaft L. The bevel wheel or pinion N is keyed to the shaft L and is held in place between the bearings R and S, which bearings are provided with suitable linings or babbitting, as shown in Fig. 2, or as shown for the bearing R in Fig. 1.

A sufficient hole or opening is made in the shell A for the introduction of the wheel or pinion N, which opening is covered by an annular projection or disk attached to the bearing R, which disk supports the shaft-bearing in position and closes the opening, so as to thoroughly exclude dust from the lower bearings.

The upper shaft-bearing is lubricated by the pipe c, which has an upward turn at its inward end to carry the oil to the top of the bearing. This pipe may be extended through one of the arms F, or be located in a cavity at the side of said arm, which will protect it from the falling fragments of stone or ore.

The eccentric-box is lubricated by the pipe d, bearings of the shaft L by the pipe e, and the lower bearings by the pipe e', and the lower end of the shaft by the oil-passage through its center. I do not, however, limit myself to this manner of lubricating the lower end of the shaft, as other well-known means may be employed, and, as I make no claim to any of the devices or methods shown for lubricating the parts they may of course, be varied to suit the ideas of different constructers.

It will be seen that the lower bearing of the eccentric-box is concentric with said box, and that the bearing of the lower end of the shaft within the eccentric-box, in so far as the shaft has any independent movement, is also concentric with its bearing. By this arrangement I avoid the wear which has heretofore occurred at the bottom end of shafts supported from below, and for the grinding movement which takes place either upon the shaft or the wearing-plates connected therewith, arising from the eccentric motion or gyration of the shaft.

The wearing upon both sets of buttons or plates f g is in all instances concentric, and by inserting these plates loosely within the shaft and by using two in each place I divide the friction and the motion when the plates or buttons revolve or turn separately. By this arrangement of the buttons and of the lower bearings I greatly reduce the wear of these parts and friction and improve the action of the crusher.

For the purpose of attaching a screen to the crusher, I have provided the top of its discharge-opening with a sufficient projection to support the shaft or stem l at its bearing n, which may be made in the form shown, and which shaft may be adjusted vertically by the adjusting of lock-nuts m. The shaft l is forked at its lower end, and between the forks the bearing for the screen-shaft is pivoted, as shown, so that the outer end of the screen may be raised or lowered without disturbing the bearing. When the screen is used, the projection or apron p will be applied, so as to deliver the crushed material into the screen. When the screen is not used, this apron may be applied or not, as desired.

What I claim as new, and desire to secure by Letters Patent, is—

1. The combination, with an axially-rotating crusher-shaft C, having a crushing-head D, of the stationary resisting-bearing E, arranged below the crushing-head and in which the shaft is supported and operates, an axially-rotating eccentric-box I, engaged with the shaft and serving to gyrate the same, and a stationary lower bearing J, arranged in alignment with the eccentric-box and in which the latter turns, substantially as described.

2. The combination, with an axially-rotating crusher-shaft C, having a crushing-head D and a tapering crushing-shell B, surrounding the periphery of the crushing-head, of the stationary resisting-bearing E, arranged below the crushing-head and in which the shaft gyrates, an axially-rotating eccentric-box I, supported by the resisting-bearing and engaging the shaft therein to gyrate the latter, and a stationary bearing J for the eccentric-box, substantially as described.

3. The combination, with the axially-rotating crusher-shaft C, having a crushing-head D and the surrounding crushing-shell B, of the stationary resisting-bearing E, located below the crushing-head and in which the shaft is supported and operates, and an axially-rotating cylindrical box having an internal eccentric-bearing engaging the shaft and serving to gyrate the same, substantially as described.

4. The combination, with the axially-rotating crusher-shaft having a crushing-head and the surrounding crushing-shell, of the tubular resisting-bearing arranged below the crushing-head and in which the shaft is supported and operates, the axially-rotating cylindrical box extending into and supported by the resisting-bearing and having an internal eccentric-bearing engaging the shaft to gyrate the same, and a stationary lower bearing for the cylindrical box, substantially as described.

5. The combination, with a crushing-shell and an axially-rotating crusher-shaft having a crushing-head, of the resisting-bearing located below the crushing-head and in which the shaft is supported and operates, an axially-rotating eccentric-box supported by the resisting-bearing and serving to gyrate the shaft, a gear-wheel engaged with the eccentric-box, and a driving-shaft having a gear-wheel engaging the gear-wheel on the box, substantially as described.

6. The combination of a crushing-cylinder B, having an interior ring $j$, with a cylinder A, having a projection B', and adjusting-blocks $k$, substantially as specified.

7. The combination, with a crushing-shell B, the central bearing E, and the rotating and gyrating shaft C, having a crushing-head, of the flanged ring $a$, engaged with and carried and supported by the shaft and adapted to turn therewith about the upper end of the central bearing, substantially as described.

8. The combination, with a crushing-shell, the stationary central bearing E, and the rotating and gyrating crusher-shaft C, having a crushing-head and enlarged above the bearing, of the elastic ring $b$, interposed between the upper edge of the bearing and the under side of the enlarged part of the shaft, substantially as described.

9. The combination, with a crushing-shell, the central bearing E, and the rotating and gyrating crusher-shaft C, enlarged above the bearing and having a crushing-head, of the elastic ring $b$, interposed between the top edge of the bearing and the under side of the enlarged part of the shaft, and the flanged ring $a$, engaged with and carried and supported by the shaft and adapted to turn therewith about the upper end of the bearing, substantially as described.

10. The combination of the central bearing E, having the arms F, with the diaphragm G, the shell A, the rotating and gyrating crusher-shaft C, having a crushing-head D, the crusher-shell B, and means for gyrating the shaft, substantially as described.

11. The combination, with the shell A, having the side opening and the crushing-shell B, of the central resisting-bearing E, having the drive-shaft bearing S, the removable shaft-bearing R, extending into the shell in alignment with the shaft-bearing of the resisting-bearing and comprising the cover-plate which closes the side opening in the shell, the drive-shaft, the rotating and gyrating crusher-shaft C, having a crushing-head, and gearing between the drive-shaft and the crusher-shaft, substantially as described.

12. The combination, with a shell A, a crushing-shell B, and a stationary bearing J, of the rotating and gyrating crusher-shaft C, an axially-rotating eccentric-box I, rotating in the stationary bearing and engaged with the lower end of the crusher-shaft, a driving-gear O for rotating the eccentric-box, the balance-wheel P, rotating with the driving-gear and of a diameter greater than said gear to give a greater travel to the balance-wheel than to the gear, and means for operating said gear, substantially as described.

13. The combination of the central bearing having the arms F and lateral drive-shaft bearing S, with the diaphragm G, the shell A, the crusher-shaft C, having a crushing-head D, the crushing-shell B, the eccentric-box I, the bevel-gears N and O, and the shaft L, journaled in the said lateral bearing, substantially as described.

14. The combination, with the eccentric-box I, of the hub Q, the lower bearing J, supporting the eccentric-box and on the upper part of which the hub rests, the bevel-gear O, secured to the said hub, and the balance-wheel P, rotating with the bevel-gear and hub, substantially as described.

15. The combination, with the shell A, having a side opening, the crushing-shell B, and the crusher-shaft C, having a crushing-head D, of the central resisting-bearing E, supporting the shaft and having the lateral shaft-bearing S, the eccentric-box I, the bevel-gear O, engaging the box, the shaft-bearing R, having the cover-plate which closes the said side opening in the shell, and the driving-shaft L, journaled in the bearings R S and carrying the bevel-gear N between the latter, substantially as described.

GEORGE LOWRY.

Witnesses:
ALBERT H. ADAMS,
ROBERT A. MILLAR.